(12) United States Patent
Gao et al.

(10) Patent No.: US 11,075,585 B2
(45) Date of Patent: Jul. 27, 2021

(54) SYNCHRONOUS RECTIFICATION CIRCUIT AND DISPLAY DEVICE

(71) Applicant: HISENSE VISUAL TECHNOLOGY CO., LTD., Shandong (CN)

(72) Inventors: Kuanzhi Gao, Shandong (CN); Wentao Han, Shandong (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 0 days.

(21) Appl. No.: 16/549,307

(22) Filed: Aug. 23, 2019

(65) Prior Publication Data
US 2020/0244176 A1 Jul. 30, 2020

Related U.S. Application Data

(63) Continuation of application No. PCT/CN2019/100926, filed on Aug. 16, 2019.

(30) Foreign Application Priority Data

Jan. 24, 2019 (CN) .......................... 201910069566.2

(51) Int. Cl.
*H02M 3/335* (2006.01)
*H02H 7/125* (2006.01)
(Continued)

(52) U.S. Cl.
CPC ........ *H02M 3/33592* (2013.01); *H02H 7/125* (2013.01); *H02M 1/4208* (2013.01); *H05B 47/10* (2020.01)

(58) Field of Classification Search
CPC ............ H02M 3/33592; H02M 1/4208; H05B 47/00; H05B 47/10; H05B 47/17; H05B 47/165
See application file for complete search history.

(56) References Cited

U.S. PATENT DOCUMENTS

2007/0165429 A1* 7/2007 Selvaraju .......... H02M 3/33592
363/53
2010/0142229 A1* 6/2010 Chen ................. H02M 3/33592
363/21.02
(Continued)

FOREIGN PATENT DOCUMENTS

CN          2884679 Y      3/2007
CN        101141095 A      3/2008
(Continued)

OTHER PUBLICATIONS

Machine Translation of CN105741788A. (Year: 2016).*
(Continued)

*Primary Examiner* — Alexander H Taningco
*Assistant Examiner* — Pedro C Fernandez
(74) *Attorney, Agent, or Firm* — Brinks Gilson & Lione

(57) ABSTRACT

A synchronous rectifier circuit and a display device are provided. In some implementations, the circuit includes a controller, a first MOSFET and a protection circuit. A first detection terminal of the controller is connected with a first end of the first MOSFET, an input of the controller is connected with a second end of the first MOSFET and configured to input a driving voltage to the first MOSFET, and a ground terminal of the controller is connected with a third end of the first MOSFET. An output of the protection circuit is connected with the control end of the controller. The protection circuit is configured to send a control signal to the controller when receiving a shutdown signal and/or a power-down signal of an alternating current power supply. The control signal is configured for the controller to stop sending the driving voltage to the first MOSFET or supplying power to the controller.

16 Claims, 6 Drawing Sheets

(51) Int. Cl.
  *H02M 1/42*  (2007.01)
  *H05B 47/10* (2020.01)

(56) References Cited

U.S. PATENT DOCUMENTS

| | | | |
|---|---|---|---|
| 2011/0317453 A1 | 12/2011 | Fan et al. | |
| 2015/0023062 A1* | 1/2015 | Hyugaji | H02M 3/33569 363/16 |
| 2015/0138844 A1* | 5/2015 | Karlsson | H02M 3/33592 363/21.1 |
| 2015/0155791 A1* | 6/2015 | Bao | H02M 7/19 363/17 |
| 2018/0287507 A1 | 10/2018 | Yamada | |

FOREIGN PATENT DOCUMENTS

| CN | 201113814 Y | 9/2008 |
|---|---|---|
| CN | 101471609 A | 7/2009 |
| CN | 102437725 A | 5/2012 |
| CN | 203457063 U | 2/2014 |
| CN | 204334375 U | 5/2015 |
| CN | 104836443 A | 8/2015 |
| CN | 105186850 A | 12/2015 |
| CN | 105207457 A | 12/2015 |
| CN | 105703642 A | 6/2016 |
| CN | 105741788 A | 7/2016 |

OTHER PUBLICATIONS

Machine Translation of CN204334375U. (Year: 2015).*
ISA State Intellectual Property Office of the People's Republic of China, International Search Report Issued in Application No. PCT/CN2019/100926 dated Nov. 18, 2019, WIPO, 5 pages.
State Intellectual Property Office of the People's Republic of China, Office Action and Search Report Issued in Application No. 2019100695662, dated Dec. 21, 2020, 11 pages, (Submitted with Machine Translation).

* cited by examiner

SYNCHRONOUS RECTIFICATION CIRCUIT AND DISPLAY DEVICE

CROSS REFERENCE TO RELATED APPLICATIONS

This application is a continuation application of International PCT Patent Application No. PCT/CN2019/100926 filed on Aug. 16, 2019, which claims priority to Chinese Patent Application No. 201910069566.2 filed on Jan. 24, 2019, the entire contents of which are incorporated herein by reference.

TECHNICAL FIELD

The present disclosure relates to a power source and in particular to a synchronous rectification circuit and a display device.

BACKGROUND

With continuous development of electronic technologies, operating voltages of a circuit are becoming lower and operating currents are becoming larger. Further, operating at a low voltage helps reduce entire power consumption of the circuit. To reduce a rectification loss of a switching power supply in a display device, the switching power supply may utilize a metal-oxide-semiconductor field effect transistor (MOSFET, also called an MOS transistor for short) rather than a rectifier diode to realize synchronous rectification of the switching power supply.

SUMMARY

In a first aspect, a synchronous rectification circuit according to the present disclosure includes a controller, a first MOS transistor and a protection circuit. A first detection terminal of the controller is connected with a first end of the first MOS transistor, an input of the controller is connected with a second end of the first MOS transistor and configured to input a driving voltage to the first MOS transistor, and a ground terminal of the controller is connected with a third end of the first MOS transistor. An input of the protection circuit is configured to receive a shutdown signal and/or a power-down signal of an alternating current power supply. An output of the protection circuit is connected with a control end of the controller. The protection circuit is configured to send a control signal to the controller when receiving the shutdown signal and/or the power-down signal. The control signal is configured for the controller to stop sending a driving voltage to the first MOS transistor or stop supplying power to the controller.

In a second aspect, a display device according to the present disclosure includes a switching power supply, a main board, a backlight assembly and a display assembly. The switching power supply includes a power factor correction (PFC) module and a resonant converter (LLC) module. The main board is connected with the display assembly. The LLC module includes the synchronous rectification circuit as described in the first aspect. The PFC module is connected with the LLC module, the LLC module is connected with the main board and the backlight assembly respectively, and the main board and the backlight assembly is connected with the display assembly respectively.

BRIEF DESCRIPTION OF THE DRAWINGS

The accompanying drawings for facilitating illustration of various embodiments of the current disclosure are described briefly below. The drawings are merely examples of the present disclosure and other drawings may be derived by those of ordinary skill in the art based on these drawings without creative work.

Figure 1A:
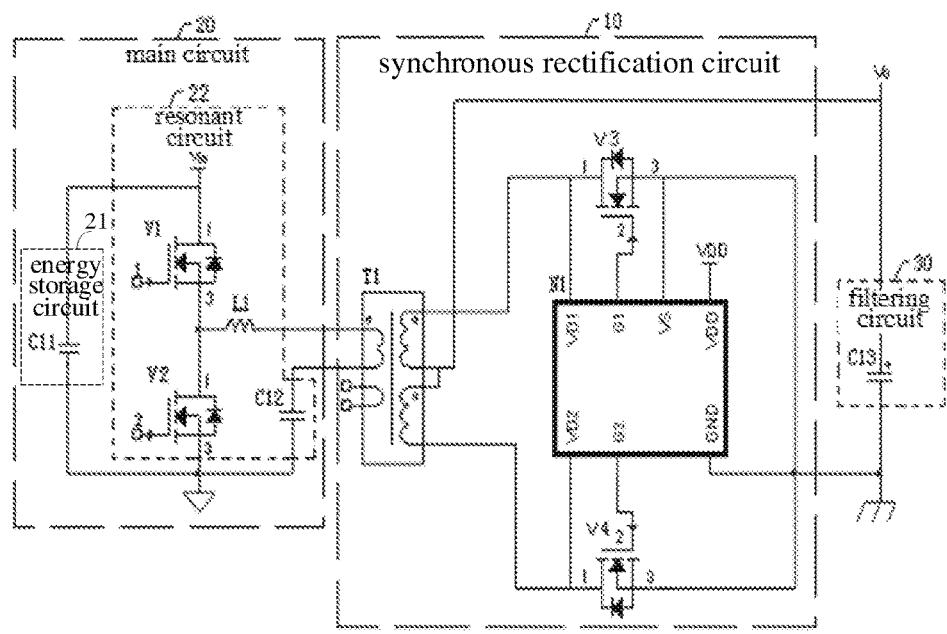
FIG. 1a is a schematic diagram illustrating a circuit of a switching power supply according to some example embodiment of the present disclosure.

In the drawings, labels for the various electronic components are the following:
1—switching power supply,
20—main circuit,
10—synchronous rectification circuit,
30—filtering circuit,
21—resonant circuit,
22—energy storage circuit,
2—main board,
3—backlight assembly,
4—display assembly,
1A—PFC module,
1B—LLC module,
100—synchronous rectification circuit,
101—controller,
102—first MOS transistor,
103—protection circuit,
1031—signal detection circuit,
1032—signal control circuit,
104—transformer,
105—power-down detection circuit,
1051—rectifier,
1052—voltage comparator, and
1053—photoelectric coupler.

DETAILED DESCRIPTION OF THE EMBODIMENTS

While the present disclosure makes reference to specific embodiments, it should be understood that these embodiments are merely illustrative and exemplary. Other embodiments are possible, and modifications can be made to the disclosed embodiments within the spirit and scope of the teachings herein. Further, when a particular feature, structure or characteristic is described in connection with an embodiment, it is submitted that it is within the knowledge of one of ordinary skill in the relevant art to apply such feature, structure or characteristic in connection with other embodiments whether or not explicitly described.

Figure 1B:
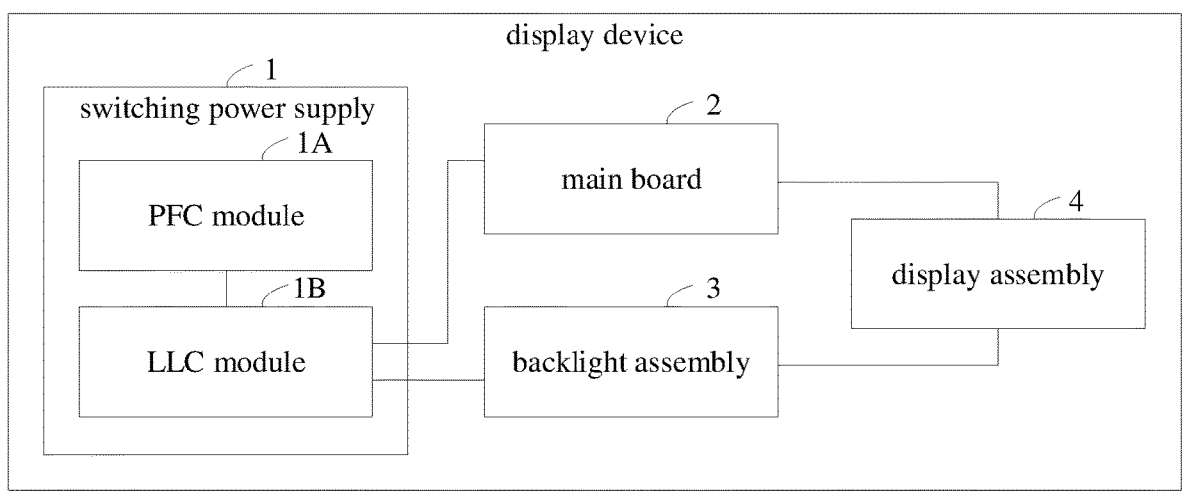
FIG. 1b is a schematic diagram illustrating a structure of a display device according to some example embodiment of the present disclosure.

In FIG. 1b, the display device includes a switching power supply 1, a main board 2, a backlight assembly 3 and a display assembly 4. The switching power supply 1 includes a Power Factor Correction (PFC) module 1A and a resonant converter module 1B. The resonant converter module 1B is also referred to as an LLC module. Generally, the LLC module includes two inductors (LL) and one resonant capacitor (C). The LLC module 1B includes a synchronous rectification circuit (not shown in FIG. 1b) which may be a synchronous rectification circuit 10 (FIG. 1a) or a synchronous rectification circuit 100 (FIGS. 2-7). The PFC module 1A is connected with the LLC module 1B. The LLC module 1B is connected with the main board 2 and the backlight assembly 3, and the main board 2 and the backlight assembly 3 are connected with the display assembly 4.

Generally, the PFC module 1A includes a PFC inductor, a switching power device and a PFC control chip. The PFC module 1A is mainly configured to perform power factor correction for an input alternating current power source and output a stable direct current bus voltage (for example, 380V) to the LLC module 1B. The PFC module 1A effectively increases the power factor of the power source and ensures that the voltage and current are in phase.

The LLC module 1B may include a double MOS-transistor LLC resonant converter circuit. The synchronous rectification circuit is usually included in the LLC module 1B. The synchronous rectification circuit mainly includes a transformer, a controller, two MOS transistors and a diode. Further, the LLC module 1B includes a pulse frequency modulation (PFM) circuit, a capacitor and an inductor. The LLC module 1B is specifically configured to increase or decrease the direct current bus voltage input by the PFC module 1A and output constant voltages to the main board 2 and the backlight assembly 3, thereby realizing a display function of the display assembly 4.

Further, an electromagnetic interference (EMI) filter (not shown in FIG. 1b) is connected between the alternating current power supply and the PFC module 1A to perform high frequency filtering and rectification for the input alternating current and then input a full wave signal to the PFC module 1A. The switching power supply 1 further includes a flyback module (not shown in FIG. 1b) configured to provide its own supply voltage and standby power supply to the PFC module 1A and the LLC module 1B.

The main board 2 includes devices such as a controlling unit. The main board 2 receives a voltage output by the LLC module 1B, performs encoding and decoding for received audio and video signals and then inputs the signals to the display assembly 4. The backlight assembly 3 receives the voltage output by the LLC module 1B to produce backlight to the display assembly 4. The display assembly 4 includes but not limited to a liquid crystal display assembly.

In the display device, the switching power supply 1 may be included as part of the display assembly 4. Optionally, the switching power supply 1 and the display assembly 4 may be separate or the display assembly 4 may be part of the switching power supply 1. When the display assembly 4 is needed to be powered by the switching power supply 1, the switching power supply 1 provides power to the display assembly 4, so that the display assembly 4 operates normally.

The display device includes but not limited to electric devices such as a household appliance, an industrial appliance and a terminal device.

At present, the synchronous rectification circuit 10 in the switching power supply 1 is usually connected with a current-limiting resistor through a transformer winding to directly drive an MOS transistor. In this way, the MOS transistor is turned on to achieve the synchronous rectification. In FIG. 1a, the switching power supply 1 mainly includes: a main circuit 20, a synchronous rectification circuit 10 and a filtering circuit 30. The main circuit 20 includes a resonant circuit 22 and an energy storage circuit 21. The resonant circuit 22 includes two MOS transistors (i.e., NMOS transistors respectively illustrated by V1 and V2 in FIG. 1a), a resonant inductor L1 and a resonant capacitor C12. The energy storage circuit 21 comprises an energy storage capacitor C11 and the filtering circuit 30 comprises a filtering capacitor C13.

The synchronous rectification circuit 10 includes a transformer T1, a controller N1 and two MOS transistors (i.e., NMOS transistors respectively illustrated by V3 and V4 in FIG. 1a). The alternating current (e.g. mains electricity) is converted into a direct current Vin through a bridge rectification circuit and the direct current Vin is transmitted to the transformer T1 through the MOS transistors V1, V2 and the resonant capacitor C12. The transformer T1 generates synchronous driving signals which are transmitted to drain electrodes of the MOS transistors V3 and V4 respectively. In the controller N1, a pin VD1 is connected with a drain electrode of the MOS transistor V3, a pin G1 is connected with a gate electrode of the MOS transistor V3, a pin VD2 is connected with a drain electrode of the MOS transistor V4, and a pin G2 is connected with a gate electrode of the MOS transistor V4. In this case, the controller N1 detects drain voltages of the MOS transistors V3 and V4 respectively. When the controller N1 detects the drain voltage of the MOS transistor V3 as negative through the pin VD1 and detects the drain voltage of the MOS transistor V4 as negative through the pin VD2, the controller N1 inputs a driving voltage to the gate electrode of the MOS transistor V3 through the pin G1 and inputs a driving voltage to the gate electrode of the MOS transistor V4 through the pin G2. As a result, the MOS transistors V3 and V4 are both turned on. When the controller N1 detects that the drain voltage of the MOS transistor V3 is higher than a preset value through the pin VD1 and the drain voltage of the MOS transistor V4 is higher than a preset value through the pin VD2 respectively, the controller N1 stops inputting the driving voltage to the drain electrode of the MOS transistor V3 through the pin G1 and stops inputting the driving voltage to the drain electrode of the MOS transistor V4 through the pin G2 respectively. As a result, the MOS transistors V3 and V3 are both turned off so that no back-flowing current flows through the MOS transistors V3 and V4.

In the above switching power supply 1, the main circuit 20 includes the MOS transistor V1, the MOS transistor V2 and the capacitor C12, providing the switching power supply 1 with a voltage delay and thus a retaining voltage for a period of voltage retention time. As a result, the switching power supply 1 supplies power to a load normally during the period of voltage retention time, thereby avoiding a phenomenon where the switching power supply 1 cannot supply power to the load normally due to dip or interruption of the alternating current supply. The load referred herein, for example, may include the main board 2 and the backlight assembly 3 connected with an output of the switching power supply 1.

In some examples, the switching power supply 1 is not limited to the devices shown in FIG. 1a.

However, when the alternating current power supply stops supplying power or when a dip or an interruption of the alternating current occurs, the inductor L1 in the main circuit 20 generates a resonance, which is transmitted to a secondary coil of the transformer T1 in the synchronous rectification circuit 10 to generate a voltage. The voltage turns on the MOS transistors V3 and V4 in the synchronous rectification circuit 10.

Generally, under an under-voltage protection of the capacitor C11, the MOS transistors V1 and V2 are not turned off immediately, which ensures that the switching power supply 1 supplies power to a load V0 normally in a presence of a dip or an interruption in the alternating current. The dip or the interruption of the alternating current results from the circumstances such as unstable power supply of a power supply grid or a bad contact of connection lines. Further, the alternating current restores to normal over a period of time. Further, the MOS transistors V1 and V2 turn on when the alternating current restores to normal. In this case, the MOS transistors V1 and V2 cause a power supply delay for the switching power supply 1. However, unreleased energy still exists on the inductor L1 connected with a primary coil of the transformer T1 upon the MOS transistors V1 and V2 being turned off. The energy exists in the form of an exciting current. Also, a resonant current is generated from the exciting current through the resonant capacitor C12, and is transmitted to the secondary coil of the transformer T1. Generally, a diode in the MOS transistor is turned on with a very small current. Thus, a very small resonant current is sufficient to enable the diodes in the MOS transistors V3 and V4 to be turned on. In this case, the controller N1 detects the drain voltage of the MOS transistor V3 as negative through the pin VD1 and detects the drain voltage of the MOS transistor V4 as negative through the pin VD2 respectively, then inputs the driving signals to the V3 through the pin G1 and the V4 through the pin G2 respectively. As a result, the MOS transistors V3 and V4 are turned on.

Since the exciting current generated by the inductor L1 has a small amplitude and a fast phase change frequency, the voltage polarity on the secondary coil of the transformer T1 in the synchronous rectification circuit 10 will be reversed immediately. Further, the reversion time of the exciting current may be less than a minimum conducting time of the MOS transistor, and therefore, the controller N1 in the synchronous rectification circuit 10 is unable to turn off the MOS transistors V3 and V4. As such, a large back-flowing current is generated on the MOS transistors V3 and V4, and a high voltage is generated on the secondary coil of the transformer T1 due to the back-flowing current and the high voltage is applied to the MOS transistor V3 or V4. Such high voltage may cause damages to the MOS transistors V3 and V4, leading to a reduction of the conversion efficiency and increasing in cost of the switching power supply 1.

A synchronous rectification circuit 100 is provided in the present disclosure. The MOS transistors are immediately turned off when a protection circuit 103 detects that the alternating current power supply stops supplying power or when a dip or an interruption of the alternating current occurs, thereby effectively avoiding damages of the MOS transistors due to the back-flowing current. The specific structure of the synchronous rectification circuit 100 will be further discussed below in combination with specific examples.

Figure 2:
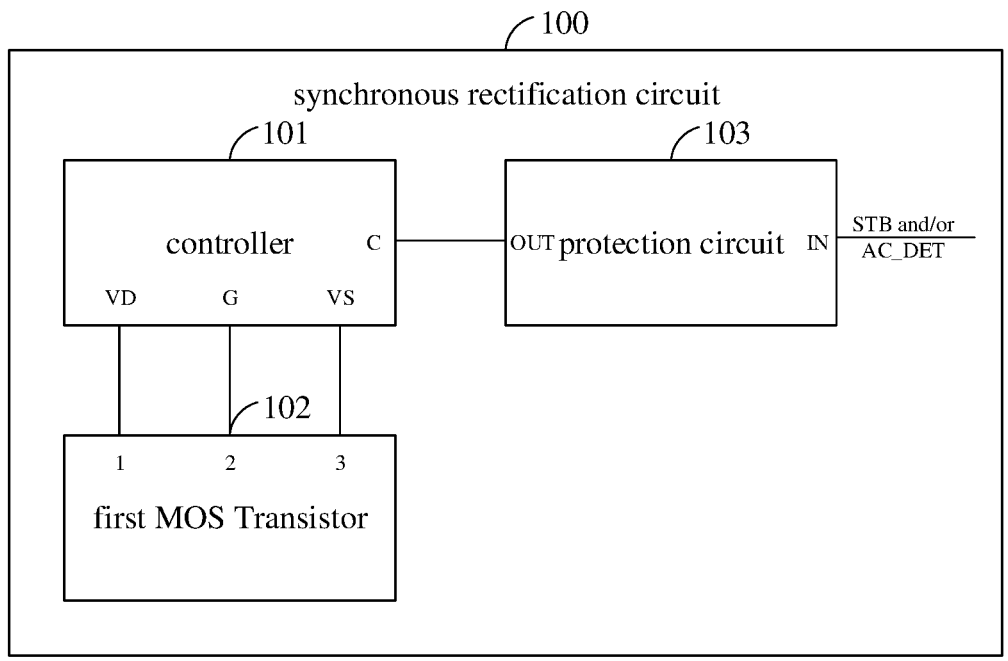
FIG. 2 is a schematic diagram illustrating a structure of a synchronous rectification circuit according to some example embodiment of the present disclosure.

FIG. 2 is a schematic diagram illustrating a structure of a synchronous rectification circuit according to some examples of the present disclosure. In FIG. 2, the synchronous rectification circuit 100 includes a controller 101, a first MOS transistor 102 and a protection circuit 103.

A first detection terminal of the controller 101 is connected with a first end of the first MOS transistor 102, an input of the controller 101 is connected with a second end of the first MOS transistor 102 and configured to input a driving voltage to the first MOS transistor 102, and a ground terminal of the controller 101 is connected with a third end of the first MOS transistor 102. An input of the protection circuit 103 is configured to receive a shutdown signal and/or a power-down signal of the alternating current power supply, and an output of the protection circuit 103 is connected with a control end of the controller 101.

The protection circuit 103 is configured to send a control signal to the controller 101 upon receiving the shutdown signal and/or the power-down signal. The control signal is used to enable the controller 101 to stop sending the driving voltage to the first MOS transistor 102 or supplying power to the controller 101.

In a case that the alternating current instantaneously drops or is interrupted, an energy storage capacitance is configured to enable normal power supply of the load. As a result, resonance is easily generated by the inductor and the capacitor in a circuit. A current generated by the resonance turns on the MOS transistor through the secondary coil of the transformer. An oscillation energy on the inductor is small, a resulting exciting current has a small amplitude and a fast phase transformation frequency, and therefore the exciting current will return to zero quickly and continue reverse oscillation, so that the polarity of the resonant voltage on the secondary coil of the transformer will be reversed immediately. The reversion time of the exciting current is less than a minimum conducting time of the MOS transistor. Thus, the secondary coil of the transformer inputs a back-flowing current to the MOS transistor. In the present disclosure, when it is detected that the alternating current power supply stops supplying power or when the alternating current instantaneously drops or is interrupted, the MOS transistor in the synchronous rectification circuit is immediately turned off by using the protection circuit, so that the MOS transistor in the synchronous rectification circuit is turned off earlier than the MOS transistor in the main circuit of the switching power supply, thereby effectively avoiding damages of the MOS transistors in the synchronous rectification circuit due to the back-flowing current generated in the main circuit of the switching power supply. Therefore, the cost of the devices is reduced, and the reliability of the synchronous rectification circuit is thus improved; the conversion efficiency of the switching power supply is increased, and the quality of the display device is thus improved.

For convenience of descriptions, in FIG. 2, the first detection terminal of the controller 101 is denoted as VD, the input of the controller 101 is denoted as G, the ground terminal of the controller 101 is denoted as VS, the control end of the controller 101 is denoted as C, the first end of the first MOS transistor 102 is denoted as 1, the second end of the first MOS transistor 102 is denoted as 2, the third end of the MOS transistor 102 is denoted as 3, the input of the protection circuit 103 is denoted as IN, the output of the protection circuit 103 is denoted as OUT, the shutdown signal is denoted as STB and the power-down signal is denoted as AC_DET.

Specifically, the input IN of the protection circuit 103 receives the shutdown signal or the power-down signal of the alternating current power supply. The shutdown signal refers to a signal corresponding to a signal causing the alternating current power supply to stop supplying power. Generally, the shutdown signal may be a signal sent by an operator. The power-down signal refers to a signal corresponding to a dip or an interruption of the alternating current power supply. Generally, the power-down signal is detected by a circuit or in another manner. For convenience of description, a specific process of detecting the power-down signal in a case of a dip or an interruption of the alternating current power supply will be described below in combination with a power-down detection circuit 105 in FIG. 8.

Figure 8:
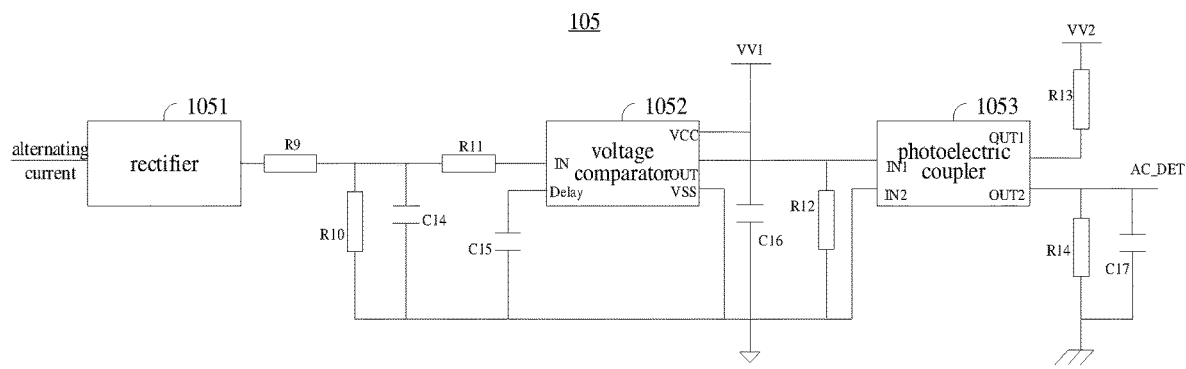
FIG. 8 is a schematic diagram illustrating a power-down detection circuit according to some example embodiment of the present disclosure.

In FIG. 8, the power-down detection circuit 105 includes a rectifier 1051, a first voltage-dividing resistor R9, a second voltage-dividing resistor R10, a first filtering capacitor C14, a third voltage-dividing resistor R11, a delay capacitor C15, a voltage comparator 1052, a second filtering capacitor C16, a pull-down resistor R12, a photoelectric coupler 1053, a fourth voltage-dividing resistor R13, a fifth voltage-dividing resistor R14 and a third filtering capacitor C17.

An input of the rectifier 1051 is configured to connect with the alternating current power supply, and an output of the rectifier 1051 is connected with a first end of the first voltage-dividing resistor R9. A second end of the first voltage-dividing resistor R9 is connected with a first end of the second voltage-dividing resistor R10, a first end of the first filtering capacitor C14, and a first end of the third voltage-dividing resistor R11 respectively. A second end of the third voltage-dividing resistor R11 is connected with an input of the voltage comparator 1052. A first end of the delay capacitor C15 is connected with a delay terminal Delay of the voltage comparator 1052, a power supply end VCC of the voltage comparator 1052 is connected with a first supply voltage VV1 and a first end of the second filtering capacitor C16 respectively, and an output OUT of the voltage comparator 1052 is connected with a first end of the pull-down resistor R12 and a first input INT1 of the photoelectric coupler 1053. A second end of the first filtering capacitor C14, a second end of the delay capacitor C15, a ground terminal VSS of the voltage comparator 1052, a second end of the second filtering capacitor C16, a second end of the pull-down resistor R12 and a second input 11\12 of the photoelectric coupler 1053 are all connected with an analog ground. A first output OUT1 of the photoelectric coupler 1053 is connected with a second supply voltage VV2 through the fourth voltage-dividing resistor R13. A second output OUT2 of the photoelectric coupler 1053 is connected with a first end of the fifth voltage-dividing resistor R14 and a first end of the third filtering capacitor C17 respectively. A second end of the fifth voltage-dividing resistor R14 and a second end of the third filtering capacitor C17 are both connected with a digital ground. The second output OUT2 of the photoelectric coupler 1053 is set to a detection terminal of the power-down signal.

The delay end of the voltage comparator 1052 has a delay function due to connection with the delay capacitor so that the voltage comparator 1052 outputs voltage over a delayed period of time. When a dip or an interruption occurs to the alternating current power supply, electric energy stored in the energy storage circuit 21 makes sure that two MOS transistors V1 and V2 in the resonant circuit 22 will not be turned off and continues supplying power normally to the load V0 during a period of time. Thus, the delayed period of time is set according to the energy storage capability of the energy storage circuit 22, which is not limited herein.

Specifically, the alternating current is rectified into a pulsating direct current voltage after passing through the rectifier 1051. The pulsating direct current voltage is subjected to voltage division of the first voltage-dividing resistor R9 and the second voltage-dividing resistor R10, and a voltage-dividing voltage is input to the voltage comparator 1052 through the third voltage-dividing resistor R11. A reference voltage is set in the voltage comparator 1052. For example, the reference voltage of the voltage comparator 1052 is set according to each device in the power-down detection circuit 105.

When the alternating current is normally input, that is, the alternating current drops or is interrupted, the voltage-dividing voltage is greater than the reference voltage. The voltage output by the voltage comparator 1052, over a delayed period of time under the delay action of the voltage comparator 1052, enables a light emitting diode in the photoelectric coupler 1053 to emit light and turns on a switching transistor in the photoelectric coupler 1053. In this way, the second output of the photoelectric coupler 1053 outputs a high level.

When a dip or an interruption occurs to the alternating current power supply, the voltage-dividing voltage is less than the reference voltage. The voltage output by the voltage comparator 1052, over a delayed period of time under the delay action of the voltage comparator 1052, is incapable of enabling a light emitting diode in the photoelectric coupler 1053 to emit light and turn off the switching transistor in the photoelectric coupler 1053. In this way, the second output of the photoelectric coupler 1053 outputs a low level.

Further, when the second end of the photoelectric coupler 1053 outputs a high level, the power-down signal is of a high level, which indicates that the alternating current is normally input and no dip or interruption occurs. When the second end of the photoelectric coupler 1053 outputs a low level, the power-down signal is of a low level, which indicates that a dip or an interruption occurs to the alternating current.

Further, when receiving the shutdown signal, the protection circuit 103 detects that the alternating current power supply stops supplying power. When receiving the power-down signal of the alternating current power supply, the protection circuit 103 detects that a dip or an interruption occurs to the alternating current.

The shutdown signal and the power-down signal may be indicated by high and low levels, or may be indicated by voltage values or current values within a preset range, which is not limited herein.

For example, when the shutdown signal received by the protection circuit 103 is of high level, the protection circuit 103 determines that the alternating current power supply stops supplying power in the current state; when the shutdown signal received by the protection circuit 103 is of low level, the protection circuit 103 determines that the alternating current power supply does not stop supplying power in the current state.

For another example, when the shutdown signal received by the protection circuit 103 is one of 0 volt (V) and 2V, the protection circuit 103 determines that the alternating current power supply stops supplying power in the current state. When the shutdown signal received by the protection circuit 103 is one of 2V and 5V, the protection circuit 103 determines that the alternating current power supply does not stop supplying power in the current state.

Further, when receiving the shutdown signal and/or the power-down signal, the protection circuit 103 sends a control signal to the controller 101 through a connection between the protection circuit 103 and the control end C of the controller 101. The specific embodiments of the control signal are not limited in the examples of the present disclosure. The control signal may be indicated by high and low levels, or may be indicated by a voltage value or a current value within a preset range, which is not limited herein.

Further, the control signal enables the controller 101 to stop sending the driving voltage to the first MOS transistor 102 or supplying power to the controller 101. Therefore, in a case that the alternating current power supply stops supplying power or the alternating current instantaneously drops or is interrupted, the protection circuit 103 directly controls the controller 101 such that it is e unable to provide the driving voltage to the first MOS transistor 102, or controls the controller 101 such that it is unable to provide the driving voltage to the first MOS transistor 102 by disconnecting the power supplied to the controller 101. As a result the first MOS transistor 102 is not turned on.

The first MOS transistor 102 is turned off when the alternating current power supply stops supplying power or the alternating current power supply drops or is interrupted. Further, the first MOS transistor 102 is turned off earlier than the MOS transistor in the main circuit 20 even though the exciting current in the main circuit 20 generates resonance which is transmitted to the first MOS transistor 102 through the transformer. Since the diode in the first MOS transistor 102 has a fast recovery characteristic, a back-flowing current is prohibited, thereby avoiding damages to the MOS transistors.

The number and the type of the first MOS transistor 102 are not limited in the examples of the present disclosure. Generally, the first MOS transistor 102 may include two NMOS transistors. The two NMOS transistors are connected with the controller 101 in the same manner. Correspondingly, the controller 101 includes two detection terminals VD1 and VD2 and two inputs G1 and G2.

Further, a drain electrode of one NMOS transistor of the two NMOS transistors may be connected with one detection terminal VD1 of the controller 101, and a gate electrode of the NMOS transistor is connected with one input G1 of the controller 101. A drain electrode of another NMOS transistor of the two NMOS transistors is connected with another detection terminal VD2 of the controller 101, and a gate electrode of the NMOS transistor is connected with another input G2 of the controller 101. Source electrodes of the two NMOS transistors are both connected with the ground terminal VS of the controller 101.

Further, the protection circuit 103 may send a control signal to the controller 101 when receiving the shutdown signal and/or the power-down signal. The control signal enables the controller 101 to stop sending the driving voltage to the two NMOS transistors or supplying power to the controller 101. References may be made to the above specific process which is not repeated herein.

The synchronous rectification circuit according to some examples of the present disclosure is connected with the first end of the first MOS transistor through the first detection terminal of the controller, the input of the controller is connected with the second end of the first MOS transistor and configured to input the driving voltage to the first MOS transistor, the ground terminal of the controller is connected with the third end of the first MOS transistor, and the output of the protection circuit is connected with the control end of the controller. The input of the protection circuit sends a control signal to the controller when receiving the shutdown signal and/or the power-down signal. The control signal is used to control the controller to stop sending the driving voltage to the first MOS transistor or supplying power to the controller. In some examples, when it is detected that the alternating current power supply stops supplying power or the alternating current instantaneously drops or is interrupted, the MOS transistors in the synchronous rectification circuit is immediately turned off with the protection circuit so that the MOS transistor in the synchronous rectification circuit is turned off earlier than the MOS transistor in the main circuit of the switching power supply, thereby effectively avoiding damages to the MOS transistors in the synchronous rectification circuit due to the back-flowing current generated in the main circuit of the switching power supply. Therefore, the cost of the devices is reduced, and the reliability of the synchronous rectification circuit is thus improved; the conversion efficiency of the switching power supply is increased, and the quality of the display device is thus improved.

Figure 3:
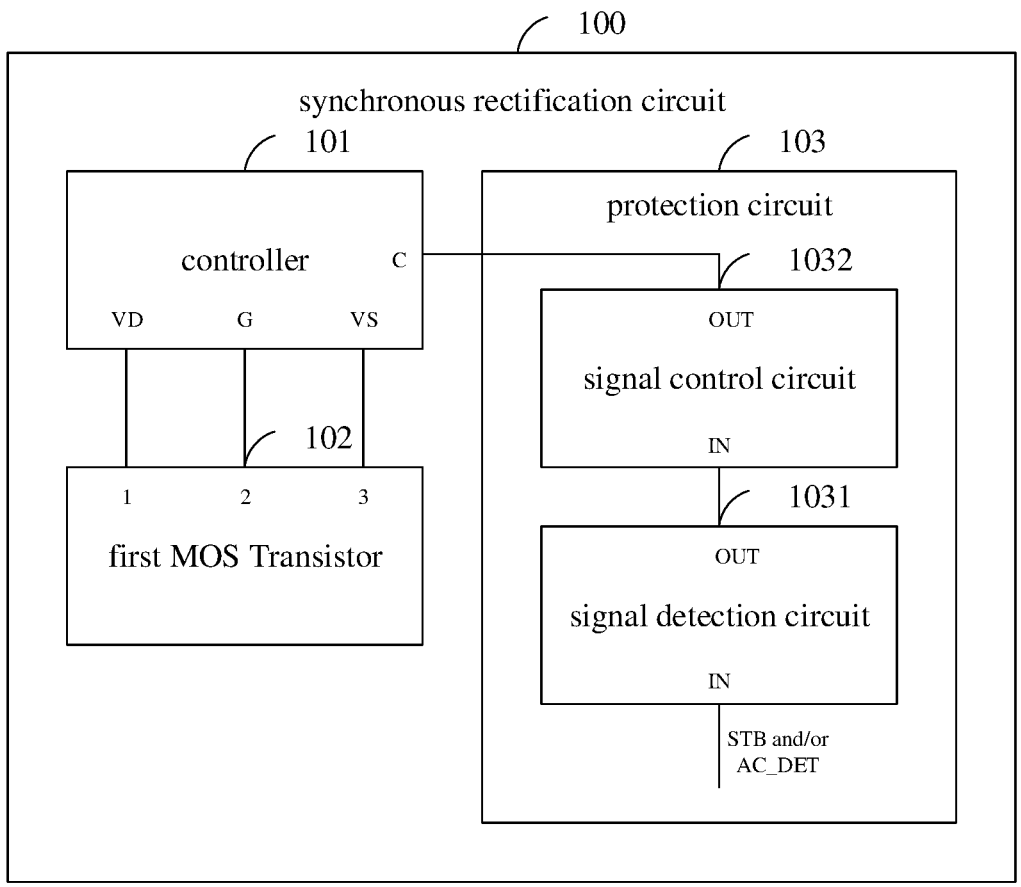
FIG. 3 is a schematic diagram illustrating a structure of a synchronous rectification circuit according to some examples embodiment of the present disclosure.

Based on the above examples of FIG. 2, the protection circuit 103 has functions such as receiving the shutdown signal and the power-down signal as well as sending a control signal to the controller 101. Therefore, the protection circuit 103 is divided into two parts based on functionalities in the examples of the present disclosure. FIG. 3 is a schematic diagram illustrating a structure of a synchronous rectification circuit according to some examples of the present disclosure. Optionally, in FIG. 3, the protection circuit 103 includes a signal detection circuit 1031 and a signal control circuit 1032.

An input of the signal detection circuit 1031 is configured to receive the shutdown signal and/or the power-down signal of the alternating current power supply. An output of the signal detection circuit 1031 is connected with an input of the signal control circuit 1032. An output of the signal control circuit 1032 is connected with the control end of the controller 101.

The signal detection circuit 1031 is configured to send an instruction signal to the signal control circuit 1032 when receiving the shutdown signal and/or the power-down signal. The instruction signal is used to turn off the first MOS transistor 102.

The signal control circuit 1032 is configured to send a control signal to the controller 101 when receiving the instruction signal.

For convenience of descriptions, in FIG. 3, the input of the signal detection circuit 1031 is denoted as IN and the output of the signal detection circuit 1031 is denoted as OUT, the input of the signal control circuit 1032 is denoted as IN and the output of the signal control circuit 1032 is denoted as OUT.

Specifically, the signal detection circuit 1301 receives the shutdown signal and the power-down signal of the alternating current power supply. Further, when receiving the shutdown signal and/or the power-down signal, the signal detection circuit 1031 sends the instruction signal to the signal control circuit 1032 through the connection with the input of the signal control circuit 1302, so that the signal control circuit 1032 determines that the first MOS transistor 102 is to be turned off based on the instruction signal.

Further, the signal control circuit 1032 sends a control signal to the controller 101 through the connection with the controller 101. The control signal enables the controller 101 to stop sending the driving voltage to the MOS transistor or supplying power to the controller 101. Thus, the controller 101 is unable to output the driving voltage to the first MOS transistor 102 so that the first MOS transistor is in an off state.

When an operator sends the shutdown signal by a device such as a remote device, the signal detection circuit 1031 directly detects the shutdown signal, or receives the shutdown signal from a system on chip (SOC) through the connection with the SOC. The specific manner of obtaining the shutdown signal by the signal detection circuit 1031 is not limited in the examples of the present disclosure.

Further, the SOC detects a size of the voltage of the alternating current power supply in real time, so that the power-down signal of the alternating current power supply is determined in a case of dip or interruption of the alternating current power supply. Thus, the signal detection circuit 1031 receives the power-down signal of the alternating current power supply from the SOC through the connection with the SOC. Further, the signal detection circuit 1031 includes a circuit for detecting the size of the voltage of the alternating current power supply to directly detect the power-down signal of the alternating current power supply. The specific manner of detecting the power-down signal of the alternating current power supply by the signal detection circuit 1031 is not limited in the examples of the present disclosure.

The specific embodiments of the signal detection circuit 1031 are not limited by the examples of the present disclosure. The specific structure of the signal detection circuit 1031 will be further discussed below with reference to FIG. 4a and FIG. 4b.

In some embodiments, the protection circuit 103 sends a control signal to the controller 101 to turn off the first MOS transistor 102 regardless of whether it is the shutdown signal or the power-down signal of the alternating current power supply being received by the signal detection circuit 1031. Thus, the signal detection circuit 1031 receives the shutdown signal and the power-down signal of an alternating voltage through one input.

Further, since the signal detection circuit 1031 sends an instruction signal to the signal control circuit 1032 only when receiving the shutdown signal and/or the power-down signal of the alternating current power supply, the signal detection circuit 1031 sends the instruction signal based on whether the shutdown signal and/or the power-down signal of the alternating current power supply is received.

Figure 4A:
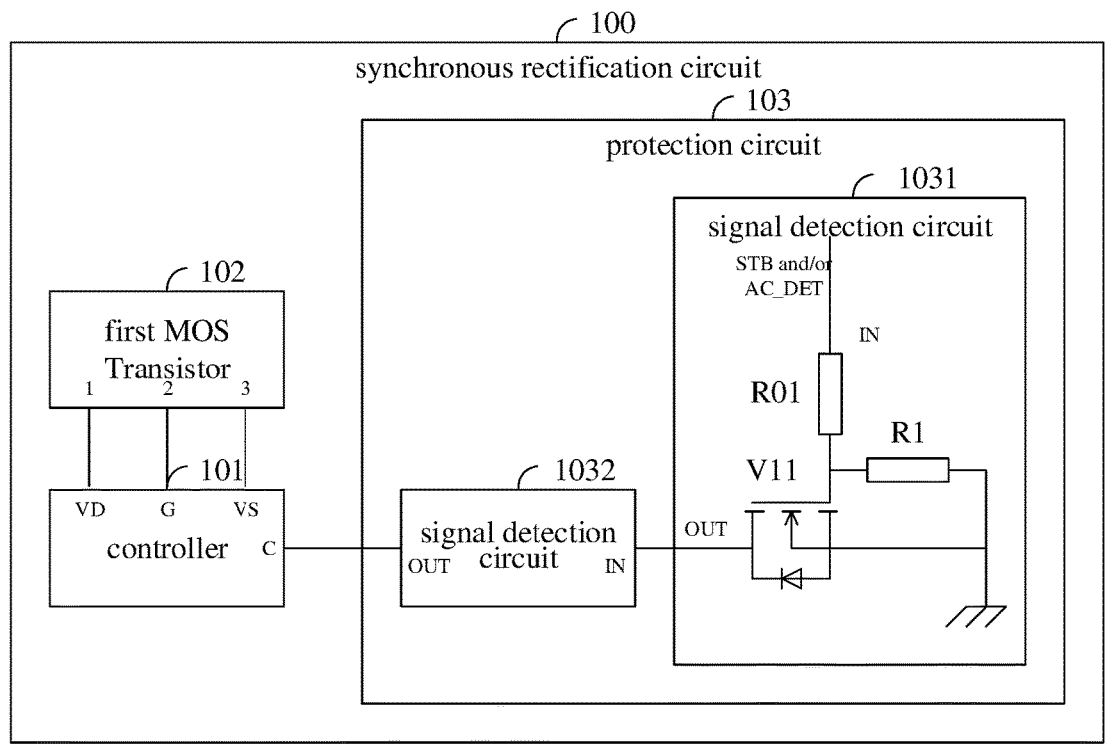
FIG. 4a is a schematic diagram illustrating a signal detection circuit in a synchronous rectification circuit according to some example embodiment of the present disclosure.

Optionally, in FIG. 4a, the signal detection circuit 1031 includes a second MOS transistor and a first resistor. A first end of the second MOS transistor is connected with the input of the signal control circuit 1032, a second end of the second MOS transistor is configured to receive the shutdown signal and/or the power-down signal, the first resistor is connected between the second end and a third end of the second MOS transistor and the third end of the second MOS transistor is grounded.

The number and the type of the second MOS transistors are not limited in the examples of the present disclosure. For convenience of descriptions, in FIG. 4a, the second MOS transistor is denoted as a NMOS transistor V11 and the first resistor is denoted as R1. A drain electrode of the second MOS transistor V11 is connected with the input IN of the signal control circuit 1032, a gate electrode of the second MOS transistor V11 is configured to receive the shutdown signal STB and/or the power-down signal AC_DET, the first resistor R1 is connected between the gate electrode and a source electrode of the second MOS transistor V11, and the source electrode of the second MOS transistor V11 is grounded.

In some examples, when the second end of the second MOS transistor does not receive the shutdown signal and/or the power-down signal, the second MOS transistor is in an initial state. The initial state is an on state or an off state, which is not limited herein. For example, the controller 101 controls the first MOS transistor 102 to work normally.

In some examples, when the second end of the second MOS transistor receives the shutdown signal and/or the power-down signal, the initial state of the second MOS transistor is changed. Thus, the first end of the second MOS transistor inputs a different level, i.e., an instruction signal, to the signal control circuit 1032. In this way, the signal control circuit 1032 sends a control signal to the controller 101 so that the controller 101 controls the first MOS transistor 102 to be turned off.

With reference to FIG. 4a, in some examples, a resistor R01 is connected with the second end of the second MOS transistor in series to protect the second MOS transistor, thereby reducing damage to the second MOS transistor due to excessively high level corresponding to the shutdown signal STB or the power-down signal AC_DET.

In other embodiments, the signal detection circuit 1031 receives both the shutdown signal and the power-down signal of the alternating current power supply, and when at least one of the shutdown signal and the power-down signal of the alternating current power supply is received, the protection circuit 103 sends a control signal to the controller 101, so that the first MOS transistor 102 is turned off. Therefore, the signal detection circuit 1031 is configured to receive the shutdown signal through one input and receive the power-down signal of the alternating voltage through another input.

Further, since the signal detection circuit 1031 sends an instruction signal to the signal control circuit 1032 only when receiving the shutdown signal and/or the power-down signal of the alternating current power supply, the signal detection circuit 1031 sends the instruction signal based on whether the shutdown signal and/or the power-down signal of the alternating current power supply is received.

Figure 4B:
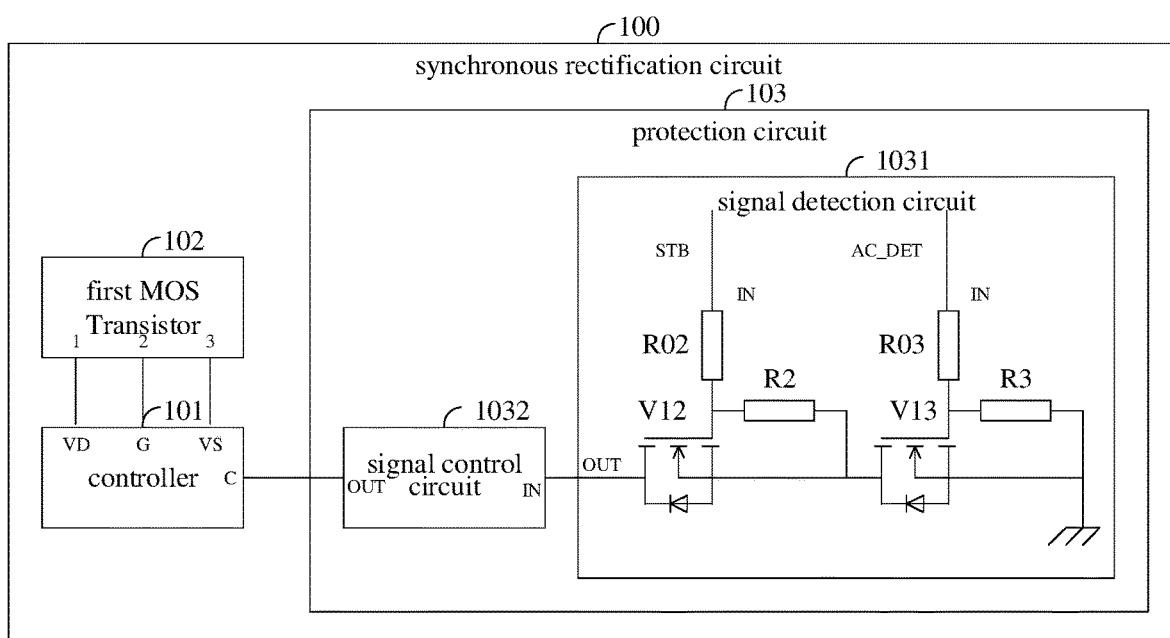
FIG. 4b is a schematic diagram illustrating a signal detection circuit in a synchronous rectification circuit according to some example embodiment of the present disclosure.

Optionally, in FIG. 4b, the signal detection circuit 1031 includes a third MOS transistor, a fourth MOS transistor, a second resistor and a third resistor.

A first end of the third MOS transistor is connected with the input of the signal control circuit 1032, a second end of the third MOS transistor is configured to receive the shutdown signal, a second end of the fourth MOS transistor is configured to receive the power-down signal, a third end of the third MOS transistor is connected with a first end of the fourth MOS transistor, the second resistor is connected between the second end and the third end of the third MOS transistor, the third resistor is connected between the second end and a third end of the fourth MOS transistor, and the third end of the fourth MOS transistor is grounded.

The numbers and the types of the third MOS transistor and the fourth MOS transistor are not limited in the examples of the present disclosure. For convenience of descriptions, as shown in FIG. 4b, the third MOS transistor is denoted as NMOS transistor V12, the fourth MOS transistor is denoted as NMOS transistor V13, the second resistor is denoted as R2 and the third resistor is denoted as R3. A drain electrode of the third MOS transistor V12 is connected with the input IN of the signal control circuit 1032, a gate electrode of the third MOS transistor V12 is configured to receive the shutdown signal STB, a gate electrode of the fourth MOS transistor V13 is configured to receive the power-down signal AC_DET, a source electrode of the third MOS transistor V12 is connected with a drain electrode of the fourth MOS transistor V13, the second resistor R2 is connected between the gate electrode and the source electrode of the third MOS transistor V12, the third resistor R3 is connected between the gate electrode and the source electrode of the fourth MOS transistor V13, and the source electrode of the fourth MOS transistor V13 is grounded.

Specifically, the third MOS transistor is connected in series with the fourth MOS transistor. As a result, when the gate electrode of the third MOS transistor does not receive the shutdown signal and the gate electrode of the fourth MOS transistor does not receive the power-down signal, the third MOS transistor and the fourth MOS transistor are both in an initial state. The initial state is an on state or an off state, which is not limited herein. At this point, the controller 101 controls the first MOS transistor to work normally.

When the gate electrode of the third MOS transistor receives the shutdown signal or the gate electrode of the fourth MOS transistor receives the power-down signal, or the gate electrode of the third MOS transistor receives the shutdown signal and the gate electrode of the fourth MOS transistor receives the power-down signal, the states of the third MOS transistor and the fourth MOS transistor are changed from the initial states. Thus, the drain electrode of the third MOS transistor inputs a different level, i.e. an instruction signal, to the signal control circuit 1032, and the signal control circuit 1032 sends a control signal to the controller 101, so that the controller 101 controls the first MOS transistor 102 to be turned off.

With reference to FIG. 4b, in some examples, a resistor R02 is connected with the second end of the third MOS transistor in series to protect the third MOS transistor, thereby avoiding damage to the third MOS transistor due to excessively high level corresponding to the shutdown signal STB or the power-down signal AC_DET. Further, in some examples, a resistor R03 is connected with the second end of the fourth MOS transistor in series to protect the fourth MOS transistor, thereby avoiding damage to the fourth MOS transistor due to excessively high level corresponding to the shutdown signal STB or the power-down signal AC_DET.

On one hand, the controller 101 is connected with its own working power supply through an input/output (I/O) interface. Further, the controller 101 detects a voltage on the drain electrode of the first MOS transistor 102, inputs a driving voltage to the gate electrode of the first MOS transistor 102 and realizes other functions. Therefore, there may exist other redundant I/O interfaces such as a second detection terminal on the controller 101.

Optionally, when the control end of the controller 101 is the second detection terminal of the controller 101, the output of the signal control circuit 1032 is connected with the second detection terminal of the controller 101. The signal control circuit 1032 is configured to send a control signal to the controller 101 when receiving the instruction signal. The control signal is used to control the controller 101 to stop sending the driving voltage to the first MOS transistor 102.

Specifically, the signal control circuit 1032 sends the control signal to the controller 101 through the connection with the second detection terminal of the controller 101 when receiving the instruction signal from the signal detection circuit 1031. The control signal enables the controller 101 to stop sending the driving voltage to the first MOS transistor 102, thereby turning off the first MOS transistor 102.

The controller 101 directly stops sending the driving voltage to the gate electrode of the first MOS transistor 102, or indirectly stops sending the driving voltage to the gate electrode of the first MOS transistor 102 by disconnecting the power supplied to the controller 101, which is not limited herein.

The specific embodiments of the signal control circuit 1032 are not limited in the examples of the present disclosure. The specific structure of the signal control circuit 1032 will be detailed below by adopting two embodiments in combination with FIG. 5a and FIG. 5b.

Figure 5A:
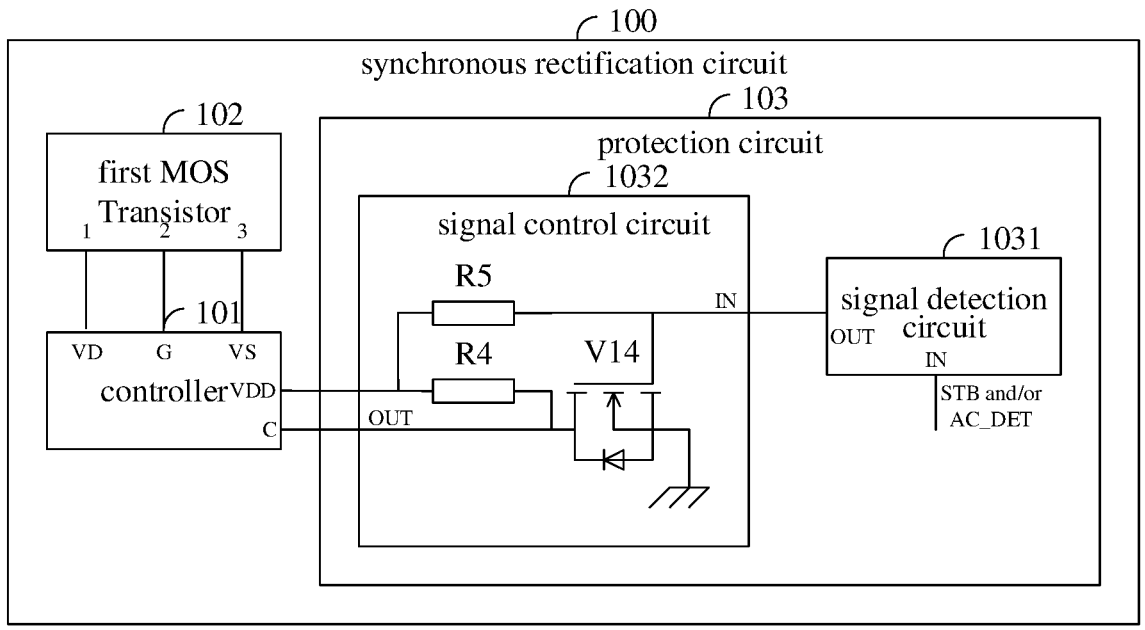
FIG. 5a is a schematic diagram illustrating a signal control circuit in a synchronous rectification circuit according to some example embodiment of the present disclosure.

In some embodiments, as shown in FIG. 5a, the signal control circuit 1032 includes a fifth MOS transistor, a fourth resistor and a fifth resistor.

In some examples, a drain electrode of the fifth MOS transistor is connected with the second detection terminal of the controller 101, a gate electrode of the fifth MOS transistor is connected with the output of the signal detection circuit 1031, a source electrode of the fifth MOS transistor is grounded, a first end of the fourth resistor is connected with the second detection terminal of the controller 101, a second end of the fourth resistor is connected with a first level, a first end of the fifth resistor is connected with the gate electrode of the fifth MOS transistor, and a second end of the fifth resistor is connected with a second level.

The number and the type of the fifth MOS transistors are not limited in the examples of the present disclosure. Further, the fourth resistor and the fifth resistor are connected with the first level and the second level respectively, or both connected with a power supply end of the controller 101, which is not limited herein.

In some examples, as shown in FIG. 5a, the fifth MOS transistor is denoted as NMOS transistor V14, the fourth resistor is denoted as R4, and the fifth resistor is denoted as R5, and the fourth resistor R4 and the fifth resistor R5 are both connected with the power supply end VDD of the controller 101. The drain electrode of the fifth MOS transistor V14 is connected with the second detection terminal C of the controller 101, the gate electrode of the fifth MOS transistor V14 is connected with the output OUT of the signal detection circuit 1031, the source electrode of the fifth MOS transistor V14 is grounded, the first end of the fourth resistor R4 is connected with the second detection terminal C of the controller 101, the second end of the fourth resistor R4 and the second end of the fifth resistor R5 are connected with the power supply end VDD of the controller 101, and the first end of the fifth resistor R5 is connected with the gate electrode of the fifth MOS transistor V14.

Specifically, the first end of the fourth resistor is connected with the second detection terminal of the controller 101, and the second end of the fourth resistor R4 is connected with the first level or the power supply end of the controller 101. Therefore, the fourth resistor is a pull-up resistor. When the fifth MOS transistor is turned off, the level on the second detection terminal of the controller 101 is clamped at a high level. As a result, when the gate electrode of the fifth MOS transistor does not receive the instruction signal from the signal detection circuit 1031, or the received instruction signal is of low level, the fifth MOS transistor is in an off state. At a result, the level detected by the second detection terminal of the controller 101 is a high level, and the controller 101 controls the first MOS transistor to work normally.

When the gate electrode of the fifth MOS transistor receives an instruction signal of high level from the signal detection circuit 1031, the fifth MOS transistor is in an on state so that the second detection terminal of the controller 101 detects the low level, i.e. the control signal. At a result, the controller 101 stops sending the driving voltage to the first MOS transistor 102, thereby turning off the first MOS transistor 102.

Figure 5B:
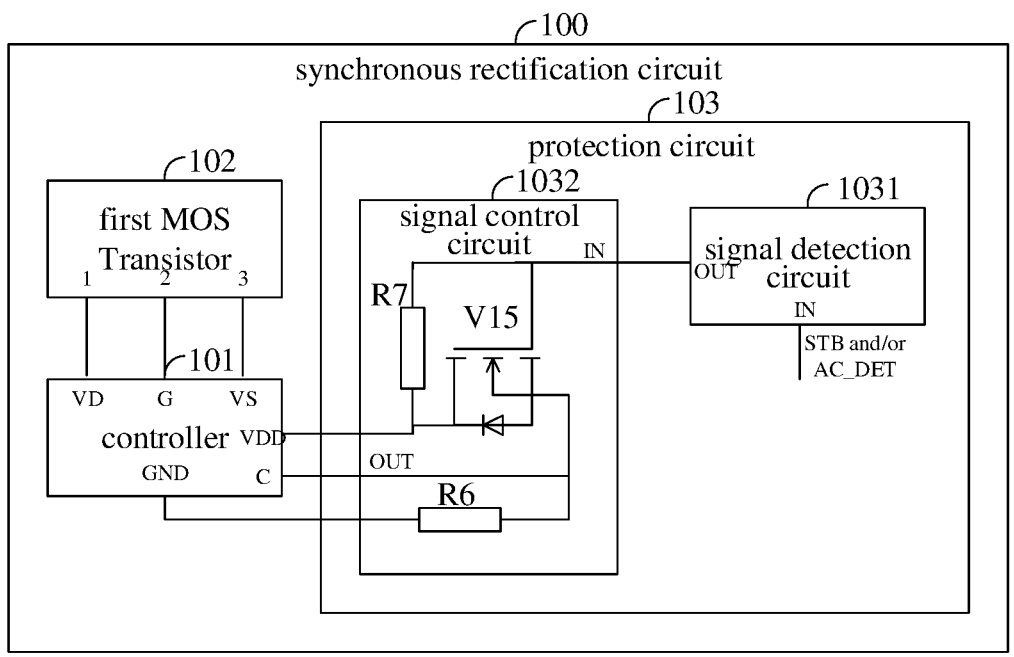
FIG. 5b is a schematic diagram illustrating another signal control circuit in a synchronous rectification circuit according to some example embodiment of the present disclosure.

In other embodiments, in FIG. 5b, the signal control circuit 1032 includes a sixth MOS transistor, a sixth resistor and a seventh resistor.

In some examples, a third end of the sixth MOS transistor is connected with the second detection terminal of the controller 101, a second end of the sixth MOS transistor is connected with the output of the signal detection circuit 1031, and a first end of the sixth MOS transistor is connected with the power supply end of the controller 101. The sixth resistor is connected between the third end of the sixth MOS transistor and the ground terminal of the controller 101, a first end of the seventh resistor is connected with the second end of the sixth MOS transistor and a second end of the seventh resistor is connected with a third level.

The number and the type of the sixth MOS transistor are not limited in the examples of the present disclosure. Further, the seventh resistor may be connected with the third level, or may be connected with the power supply end of the controller 101, which is not limited herein.

In some examples, in FIG. 5b, the sixth MOS transistor is denoted as NMOS transistor V15, the sixth resistor is denoted as R6, and the seventh resistor is denoted as R7. The seventh resistor R7 is connected with the power supply end VDD of the controller 101. A source electrode of the sixth MOS transistor V15 is connected with the second detection terminal C of the controller 101, a gate electrode of the sixth MOS transistor V15 is connected with the output OUT of the signal detection circuit 1031, a drain electrode of the sixth MOS transistor V15 is connected with the power supply end VDD of the controller 101, the sixth resistor R6 is connected between the source electrode of the sixth MOS transistor V15 and the ground terminal GND of the controller 101, and the seventh resistor R7 is connected between the gate electrode of the sixth MOS transistor V15 and the power supply end VDD of the controller 101.

Specifically, since the first end of the sixth resistor is connected with the second detection terminal of the controller 101, and the second end of the sixth resistor is connected with the ground terminal of the controller 101, the sixth resistor is a pull-down resistor. When the sixth MOS transistor is turned off, the level on the second detection terminal of the controller 101 is clamped at a low level. Therefore, when the gate electrode of the sixth MOS transistor does not receive the instruction signal from the signal detection circuit 1031 or the received instruction signal is of low level, the sixth MOS transistor is in an off state. At a result, the level detected by the second detection terminal of the controller 101 is a low level and the controller 101 controls the first MOS transistor 102 to work normally.

When the gate electrode of the sixth MOS transistor receives the instruction signal of high level from the signal detection circuit 1031, the sixth MOS transistor is in an on state, so that the second detection terminal of the controller 101 detects a high level, i.e. the control signal. As a result, the controller 101 stops sending the driving voltage to the first MOS transistor 102, thereby turning off the first MOS transistor 102.

On the other hand, the larger number of the first MOS transistors 102 means that more I/O interfaces of the controller 101 are required. Further, there is a limited number of I/O interfaces of the controller 101 in a general circumstance, and therefore no redundant I/O interfaces may exist in the controller 101.

Optionally, when the control end of the controller 101 only includes the power supply end of the controller 101, the output of the signal control circuit 1032 is connected with the power supply end of the controller 101. The signal control circuit 1032 is configured to send a control signal to the controller 101 when receiving the instruction signal. The control signal is used to enable the controller 101 to stop supplying power to the controller 101.

Specifically, the signal control circuit 1032 sends the control signal to the controller 101 through the connection with the power supply end of the controller 101 when receiving the instruction signal from the signal detection circuit 1031. The control signal is used to enable the controller 101 to stop supplying power to the controller 101, so that the controller 101 stops sending the driving voltage to the first MOS transistor 102, thereby turning off the first MOS transistor 102.

The specific embodiments of the signal control circuit 1032 are not limited in the examples of the present disclosure. The specific structure of the signal control circuit 1032 will be detailed below in combination with FIG. 5c.

Figure 5C:
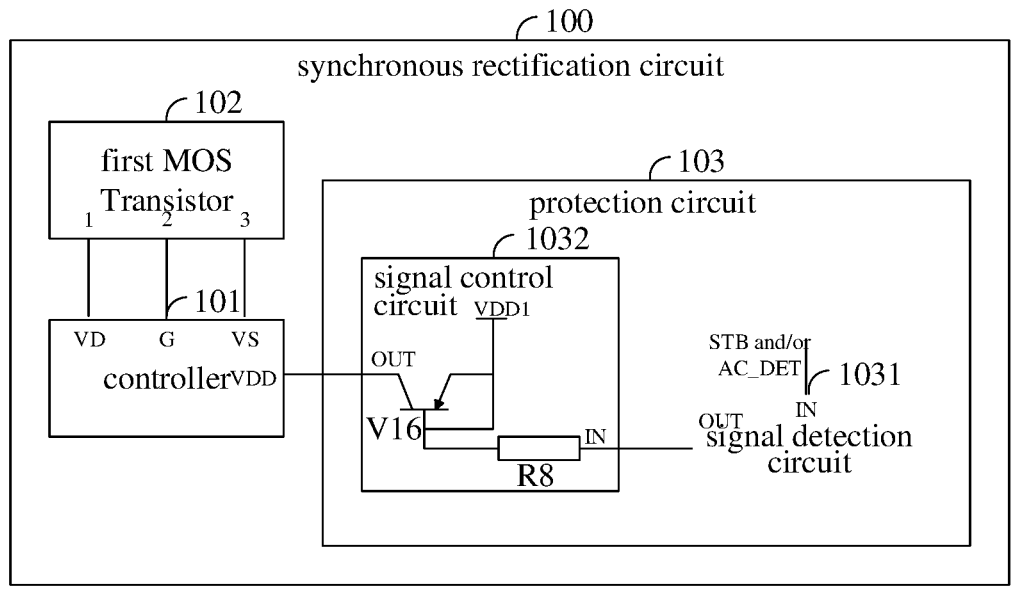
FIG. 5c is a schematic diagram illustrating yet another signal control circuit in a synchronous rectification circuit according to some example embodiment of the present disclosure.

In FIG. 5c, the signal control circuit 1032 includes a triode and an eighth resistor.

A collector electrode of the triode is connected with the power supply end of the controller 101, an emitter electrode and a base electrode of the triode are both connected with the power supply to provide a level for the controller 101, and the eighth resistor is connected between the base electrode of the triode and the output of the signal detection circuit 1031.

The number and the type of the triode are not limited in the examples of the present disclosure. For convenience of descriptions, in FIG. 5c, the triode is denoted as a PNP type triode V16, and the eighth resistor is denoted as R8. The collector electrode of the triode V16 is connected with the power supply end VDD of the controller 101, the emitter electrode and the base electrode of the triode V16 are both connected with a common power supply VDD1 to provide level for the controller 101 and the eighth resistor R8 is connected between the base electrode of the triode V16 and the input IN of the signal detection circuit 1031.

Specifically, the signal detection circuit 1031 is connected with the base electrode of the triode through the eighth resistor. In a case of change of the instruction signal, an initial state of the triode also changes. For example, the triode changes from an on state to an off state or from an off state to an on state.

Further, Since the emitter electrode of the triode is connected with the power supply VDD1 providing level to the controller 101, when the instruction signal received by the base electrode of the triode from the signal detection circuit 1031 is of low level, the triode is in an on state. As a result, the power supply end of the controller 101 is connected with the power supply powered to the controller 101 so that the controller 101 controls the first MOS transistor 102 to work normally.

When the instruction signal received by the base electrode of the triode from the signal detection circuit 1031 is of high level, the triode is in an off state so that the power supply end of the controller 101 is unable to connect with the power supply for supplying power. As a result, the controller 101 is unable to send the driving voltage to the first MOS transistor 102 so that the first MOS transistor is in an off state.

Figure 6:
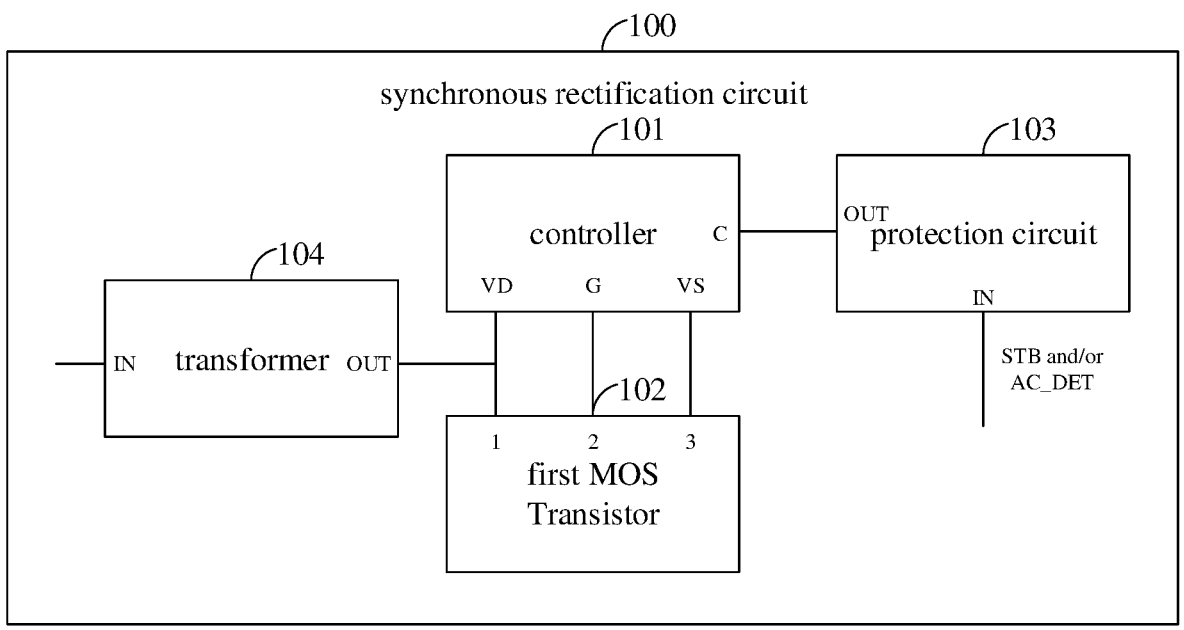
FIG. 6 is a schematic diagram illustrating a structure of a synchronous rectification circuit according to some example embodiment of the present disclosure.

On the basis of the examples as shown in FIG. 2 above, other structures of the synchronous rectification circuit 100 will be detailed in combination with FIG. 6. FIG. 6 is a schematic diagram illustrating a structure of a synchronous rectification circuit according to some examples of the present disclosure. In FIG. 6, the synchronous rectification circuit 100 further includes a transformer 104.

An input of the transformer 104 is configured to receive a direct current voltage converted by the alternating current power supply and an output of the transformer 104 is connected with the first end of the first MOS transistor 102.

The specific type of the transformer 104 is not limited in the examples of the present disclosure. For convenience of descriptions, in FIG. 6a, the input of the transformer 104 is denoted as IN and the output of the transformer 104 is denoted as OUT.

Specifically, the transformer 104 and the first MOS transistor 102 jointly form one self-excited (separately excited) blocking oscillator, so that the received direct current voltage is modulated into a high frequency pulse voltage. Further, the transformer 104 has a function of energy transfer and conversion, that is, the transformer 104 converts the input direct current voltage into different desired low voltages.

In a flyback switching power supply 1, when the first MOS transistor 102 is turned on, the transformer 104 converts electric energy into magnetic field energy for storage; when the first MOS transistor 102 is turned off, the transformer 104 releases the energy.

In a forward switching power supply 1, when the first MOS transistor 102 is turned on, the input direct current voltage is directly supplied to the load and energy is stored in an energy storage inductor of the transformer 104. When the first MOS transistor 102 is turned off, the energy storage inductor of the transformer 104 continues freewheeling and transfers energy to the load.

Figure 7:
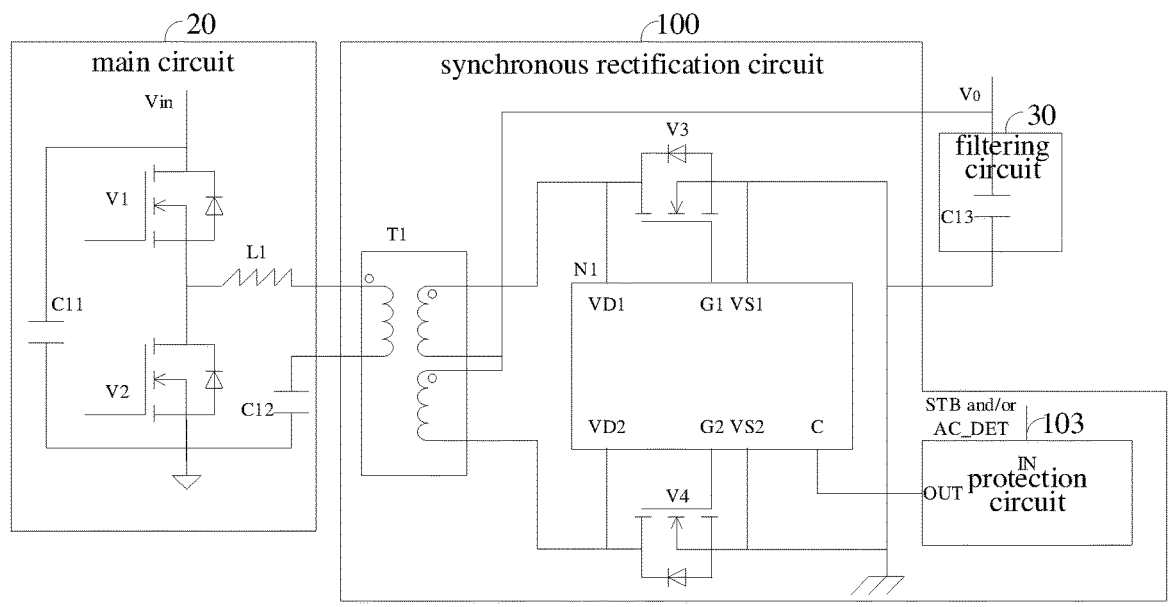
FIG. 7 is a schematic diagram illustrating a circuit of a switching power supply according to some example embodiment of the present disclosure.

In FIG. 7, the switching power supply 1 according to some examples of the present disclosure includes a main circuit 20, a filtering circuit 30 and the synchronous rectification circuit 100 shown in FIGS. 2-6.

The main circuit 20 is connected with the synchronous rectification circuit 100 connected with the filtering circuit 30. The synchronous rectification circuit 100 is configured to supply power to the load.

In addition to the above devices, the switching power supply 1 further includes other devices. Further, the devices included in the switching power supply 1 may be divided based on actual requirements, which is not limited herein.

In FIG. 7, the switching power supply 1 is denoted as a forward switching power supply 1. The main circuit 20 includes two NMOS transistors V1 and V2, the energy storage capacitor C11, the resonant inductor L1, and the resonant capacitor C12. The synchronous rectification circuit 100 includes the controller 101 (for example, the controller N1), the first MOS transistor 102 (for example, two NMOS transistors V3 and V4), the protection circuit 103 and the transformer 104 (for example, the transformer T1). The filtering circuit 30 is the filtering capacitor C13.

The drain electrode of the NMOS transistor V1 is connected with a voltage Vin. The energy storage capacitor C11 is connected between the drain electrode of the NMOS transistor V1 and the source electrode of the NMOS transistor V2 to receive a direct current voltage converted by the alternating current power supply. The first input of the transformer T1 is connected between the source electrode of the NMOS transistor V1 and the drain electrode of the NMOS transistor V2 through the resonant inductor. The second input of the transformer T1 is connected with the resonant capacitor C12. The first output of the transformer T1 is connected with the drain electrode of the NMOS transistor V3 and the first detection terminal VD1 of the controller N1 respectively. The second output of the transformer T1 is connected with the drain electrode of the NMOS transistor V4 and the second detection terminal VD2 of the controller N1 respectively. The third output and the fourth output of the transformer T1 are configured to output a load voltage V0.

The switching power supply 1 may be applied to different devices such as household appliances, industrial appliances or terminal communication devices. The switching power supply 1 according to some examples of the present disclosure includes the synchronous rectification circuit 100. The specific embodiments and technical effects are already described in the examples of the above synchronous rectification circuit 100 and thus will not be repeated herein.

Further, by applying the switching power supply 1 to the display device shown in FIG. 1b, the conversion efficiency of the switching power supply 1 is improved, the display device is able to work stably and the quality of the display device is effectively improved.

It would be apparent to one of ordinary skill in the relevant art that the embodiments as described herein can be applied in many different implementations of software, hardware, firmware and/or the entities illustrated in the figures.

The summary and abstract sections may set forth one or more but not all exemplary embodiments contemplated, and thus, are not intended to limit the scope of this disclosure or the appended claims in any way.

The foregoing descriptions of the specific embodiments are provided to reveal the general nature of the underlying principles such that others can, by applying knowledge within the ordinary skill of the art, readily modify and/or adapt for various applications without undue experimentation and without departing from the general concept as described herein. Therefore, such adaptions and modifications are intended to be within the meaning and range of equivalents of the disclosed embodiments, based on the teaching and guidance presented herein. It is to be understood that the phraseology or terminology herein is for the purpose of description and not intended as limitation, such that the terminology or phraseology of the present specification is to be interpreted by the artisan of ordinary skill in light of the teachings and guidance.

The breadth and scope of the embodiments should not be limited by any of the above-described examples, but should be defined only in accordance with the following claims and their equivalents.

The invention claimed is:

1. A rectifier circuit, comprising:
   a controller comprising a first detection terminal, a first input, a control end, and a ground terminal;
   a first Metal-Oxide-Semiconductor field effect transistor (MOSFET) including a first end, a second end and a third end, wherein the first end is connected with the first detection terminal of the controller, the second end is connected with the first input of the controller, the third end is connected with the ground terminal of the controller, the second end is configured to receive a drive voltage from the controller; and a protection circuit comprising a second input and a first output, wherein the second input is configured to receive a shutdown signal and/or a power-down signal of an alternating current power supply, the first output is connected with the control end of the controller, the protection circuit is configured to send a control signal to the controller upon receiving the shutdown signal and/or the power-down signal so as to cause the controller to stop sending a driving voltage to the first MOSFET or stop supplying power to the controller based on the control signal;

wherein the protection circuit comprises a signal detection circuit and a signal control circuit, and wherein:

the signal detection circuit comprises the second input configured to receive the shutdown signal and/or the power-down signal of the alternating current power supply and a second output;

the signal detection circuit is configured to send an instruction signal to the signal control circuit upon receiving the shutdown signal and/or the power-down signal;

the signal control circuit comprises a third input connected with the second output of the signal detection circuit and the first output connected with the control end of the controller;

the signal control circuit is configured to send the control signal to the controller upon receiving the instruction signal;

the control end of the controller comprises a second detection terminal of the controller;

the first output of the signal control circuit is connected with the second detection terminal of the controller; and the signal control circuit is configured to send the control signal to the controller upon receiving the instruction signal, wherein the control signal is configured to control the controller to stop sending the driving voltage to the first MOSFET.

2. The rectifier circuit according to claim 1, wherein the control end of the controller comprises a power supply end of the controller;

the first output of the signal control circuit is connected with the power supply end of the controller; and the signal control circuit is configured to send the control signal to the controller upon receiving the instruction signal, wherein the control signal is used to stop power supply to the controller.

3. The rectifier circuit according to claim 2, wherein the signal control circuit comprises:

a triode; and an eighth resistor;

wherein, a first end of the triode is connected with the power supply end of the controller, a second end and a third end of the triode are both connected with a level supplying power to the controller, and the eighth resistor is connected between the second end of the triode and the second output of the signal detection circuit.

4. The rectifier circuit according to claim 1, wherein the signal detection circuit comprises:

a second MOSFET; and a first resistor;

wherein, a first end of the second MOSFET is connected with the third input of the signal control circuit, a second end of the second MOSFET is configured to receive the shutdown signal and/or the power-down signal, the first resistor is connected between the second end and a third end of the second MOSFET, and the third end of the second MOSFET is grounded.

5. The rectifier circuit according to claim 1, wherein the signal detection circuit comprises a third MOSFET;

a fourth MOSFET;

a second resistor; and a third resistor;

wherein, a first end of the third MOSFET is connected with the third input of the signal control circuit, a second end of the third MOSFET is configured to receive the shutdown signal, a second end of the fourth MOSFET is configured to receive the power-down signal, a third end of the third MOSFET is connected with a third end of the fourth MOSFET, the second resistor is connected between the second end and the third end of the third MOSFET, the third resistor is connected between the second end and the third end of the fourth MOSFET, and the third end of the fourth MOSFET is grounded.

6. The rectifier circuit according to claim 1, wherein the signal control circuit comprises:

a fifth MOSFET, a fourth resistor, and a fifth resistor;

wherein, a first end of the fifth MOSFET is connected with the second detection terminal of the controller, a second end of the fifth MOSFET is connected with the second output of the signal detection circuit, a third end of the fifth MOSFET is grounded, a first end of the fourth resistor is connected with the second detection terminal of the controller, a second end of the fourth resistor is connected with a first level, a first end of the fifth resistor is connected with the second end of the fifth MOSFET, and a second end of the fifth resistor is connected with a second level.

7. The rectifier circuit according to claim 1, wherein the signal control circuit comprises:

a sixth MOSFET;

a sixth resistor; and a seventh resistor;

wherein, a third end of the sixth MOSFET is connected with the second detection terminal of the controller, a second end of the sixth MOSFET is connected with the second output of the signal detection circuit, a first end of the sixth MOSFET is connected with a power supply end of the controller, the sixth resistor is connected between the third end of the sixth MOSFET and the ground terminal of the controller, a first end of the seventh resistor is connected with the second end of the sixth MOSFET, and a second end of the seventh resistor is connected with a third level.

8. The rectifier circuit according to claim 1, wherein the signal control circuit comprises:

a sixth MOSFET, a sixth resistor, and a seventh resistor;

wherein, the third end of the sixth MOSFET is connected with the second detection terminal of the controller, the second end of the sixth MOSFET is connected with the second output of the signal detection circuit, the first end of the sixth MOSFET is connected with a power supply end of the controller, the sixth resistor is connected between the third end of the sixth MOSFET and the ground terminal of the controller, and the seventh resistor is connected between the second end of the sixth MOSFET and the power supply end of the controller.

9. A display device, comprising:
a display assembly;
a main board, in connection with the display assembly;
a backlight assembly; and
a switching power supply comprising:
   a power factor correction (PFC) module; and
   a resonant converter, LLC, module in connection with the PFC module, the LLC module is connected with the main board and the backlight assembly respectively, the LLC module includes a circuit for rectification comprising:
      a controller comprising a first detection terminal, a first input, a control end and a ground terminal;
      a first Metal-Oxide-Semiconductor field effect transistor, MOSFET, including a first end, a second end and a third end, wherein the first end is connected with the first detection terminal of the controller, the second end is connected with, the first input of the controller, the third end is connected with the ground terminal of the controller, the second end is configured to receive a drive voltage from the controller; and
      a protection circuit comprising a second input and a first output, wherein the second input is configured to receive a shutdown signal and/or a power-down signal of an alternating current power supply, and the first output is connected with the control end of the controller, the protection circuit is configured to send a control signal to the controller upon receiving the shutdown signal and/or the power-down signal so as to cause the controller to stop sending a driving voltage to the first MOSFET or stop supplying power to the controller based on the control signal;
   wherein the protection circuit comprises a signal detection circuit and a signal control circuit, and wherein:
      the signal detection circuit comprising the second input configured to receive the shutdown signal and/or the power-down signal of the alternating current power supply and a second output;
      the signal detection circuit is configured to send an instruction signal to the signal control circuit upon receiving the shutdown signal and/or the power-down signal;
      the signal control circuit comprising a third input connected with the second output of the signal detection circuit and the first output connected with the control end of the controller;
      the signal control circuit is configured to send the control signal to the controller upon receiving the instruction signal;
      the control end of the controller includes a second detection terminal of the controller;
      the first output of the signal control circuit is connected with the second detection terminal of the controller; and
      the signal control circuit is configured to send the control signal to the controller upon receiving the instruction signal, wherein the control signal is configured to control the controller to stop sending the driving voltage to the first MOSFET.

10. The display device according to claim 9, wherein
   the control end of the controller includes a power supply end of the controller, the first output of the signal control circuit is connected with the power supply end of the controller; and
   the signal control circuit is configured to send the control signal to the controller upon receiving the instruction signal, wherein the control signal is used to stop power supply to the controller.

11. The display device according to claim 10, wherein the signal control circuit comprises:
   a triode; and
   an eighth resistor;
   wherein, a first end of the triode is connected with the power supply end of the controller, a second end and a third end of the triode are both connected with a level supplying power to the controller, and the eighth resistor is connected between the second end of the triode and the second output of the signal detection circuit.

12. The display device according to claim 9, wherein the signal detection circuit comprises:
   a second MOSFET; and
   a first resistor;
   wherein, a first end of the second MOSFET is connected with the third input of the signal control circuit, a second end of the second MOSFET is configured to receive the shutdown signal and/or the power-down signal, the first resistor is connected between the second end and a third end of the second MOSFET, and the third end of the second MOSFET is grounded.

13. The display device according to claim 9, wherein the signal detection circuit comprises:
   a third MOSFET;
   a fourth MOSFET;
   a second resistor; and
   a third resistor;
   wherein, a first end of the third MOSFET is connected with the third input of the signal control circuit, a second end of the third MOSFET is configured to receive the shutdown signal, a second end of the fourth MOSFET is configured to receive the power-down signal, a third end of the third MOSFET is connected with a third end of the fourth MOSFET, the second resistor is connected between the second end and the third end of the third MOSFET, the third resistor is connected between the second end and the third end of the fourth MOSFET, and the third end of the fourth MOSFET is grounded.

14. The display device according to claim 9, wherein the signal control circuit comprises:
   a fifth MOSFET,
   a fourth resistor, and
   a fifth resistor;
   wherein, a first end of the fifth MOSFET is connected with the second detection terminal of the controller, a second end of the fifth MOSFET is connected with the second output of the signal detection circuit, a third end of the fifth MOSFET is grounded, a first end of the fourth resistor is connected with the second detection terminal of the controller, a second end of the fourth resistor is connected with a first level, a first end of the fifth resistor is connected with the second end of the fifth MOSFET, and a second end of the fifth resistor is connected with a second level.

15. The display device according to claim 9, wherein the signal control circuit comprises:
- a sixth MOSFET;
- a sixth resistor; and
- a seventh resistor;
- wherein, a third end of the sixth MOSFET is connected with the second detection terminal of the controller, a second end of the sixth MOSFET is connected with the second output of the signal detection circuit, a first end of the sixth MOSFET is connected with a power supply end of the controller, the sixth resistor is connected between the third end of the sixth MOSFET and the ground terminal of the controller, a first end of the seventh resistor is connected with the second end of the sixth MOSFET, and a second end of the seventh resistor is connected with a third level.

16. The display device according to claim 9, wherein the signal control circuit comprises:
- a sixth MOSFET;
- a sixth resistor; and
- a seventh resistor;
- wherein, the third end of the sixth MOSFET is connected with the second detection terminal of the controller, the second end of the sixth MOSFET is connected with the second output of the signal detection circuit, the first end of the sixth MOSFET is connected with a power supply end of the controller, the sixth resistor is connected between the third end of the sixth MOSFET and the ground terminal of the controller, and the seventh resistor is connected between the second end of the sixth MOSFET and the power supply end of the controller.

* * * * *